(12) United States Patent
Therry et al.

(10) Patent No.: US 11,738,675 B2
(45) Date of Patent: Aug. 29, 2023

(54) FUNCTIONAL APPARATUS FOR A VEHICLE SEAT, AND CORRESPONDINGLY EQUIPPED SEAT SYSTEM

(71) Applicant: Faurecia Autositze GmbH, Stadthagen (DE)

(72) Inventors: Jérémie Therry, Wroctaw (PL); Tomasz Stasinski, Dzierzoniow (PL); Piotr Ceglarek, Katowice (PL); Robert Grzeslo, Swidnica (PL)

(73) Assignee: Faurecia Autositze GmbH, Stadthagen (DE)

( * ) Notice: Subject to any disclaimer, the term of this patent is extended or adjusted under 35 U.S.C. 154(b) by 186 days.

(21) Appl. No.: 17/359,778

(22) Filed: Jun. 28, 2021

(65) Prior Publication Data

US 2022/0024366 A1 Jan. 27, 2022

(30) Foreign Application Priority Data

Jul. 27, 2020 (DE) .......................... 102020119769.1

(51) Int. Cl.
*B60N 2/90* (2018.01)
*B60N 2/66* (2006.01)
*B60N 2/70* (2006.01)

(52) U.S. Cl.
CPC .............. *B60N 2/914* (2018.02); *B60N 2/665* (2015.04); *B60N 2/7082* (2013.01)

(58) Field of Classification Search
CPC ....... B60N 2/914; B60N 2/665; B60N 2/7082
See application file for complete search history.

(56) References Cited

U.S. PATENT DOCUMENTS

| | | | | |
|---|---|---|---|---|
| 9,937,826 | B2 * | 4/2018 | Dry .................... | B60N 2/42763 |
| 10,286,811 | B2 * | 5/2019 | Beuschel ............ | B60N 2/42763 |
| 10,427,554 | B2 * | 10/2019 | Ketels ...................... | B60N 2/22 |
| 10,434,918 | B2 * | 10/2019 | Raines .................. | B60N 2/206 |
| 11,535,139 | B2 * | 12/2022 | Ogiso .................... | A61H 99/00 |
| 2016/0236597 | A1 | 8/2016 | Dry | |
| 2017/0066350 | A1 | 3/2017 | Dry | |
| 2022/0001781 | A1 * | 1/2022 | Spormann ............ | B60N 2/0244 |

FOREIGN PATENT DOCUMENTS

| | | |
|---|---|---|
| DE | 102009034987 A1 | 2/2011 |
| FR | 2875451 A1 | 3/2006 |

* cited by examiner

*Primary Examiner* — Syed A Islam
(74) *Attorney, Agent, or Firm* — Laurence P. Colton; SMITH TEMPEL BLAHA LLC

(57) ABSTRACT

A functional apparatus for a vehicle seat having at least one expansion member having at least one cavity, the volume of which can be changed, at least in part, by a fluid which can flow into and out of said cavity, a fluid reservoir comprising at least one cavity being provided, which cavity is connected in a fluid-conducting manner to the cavity of the expansion member. The fluid reservoir cooperates with an actuator assembly by means of which the cavity of the fluid reservoir can be actively compressed, with at least partial displacement of the fluid contained therein into the cavity of the expansion member.

20 Claims, 8 Drawing Sheets

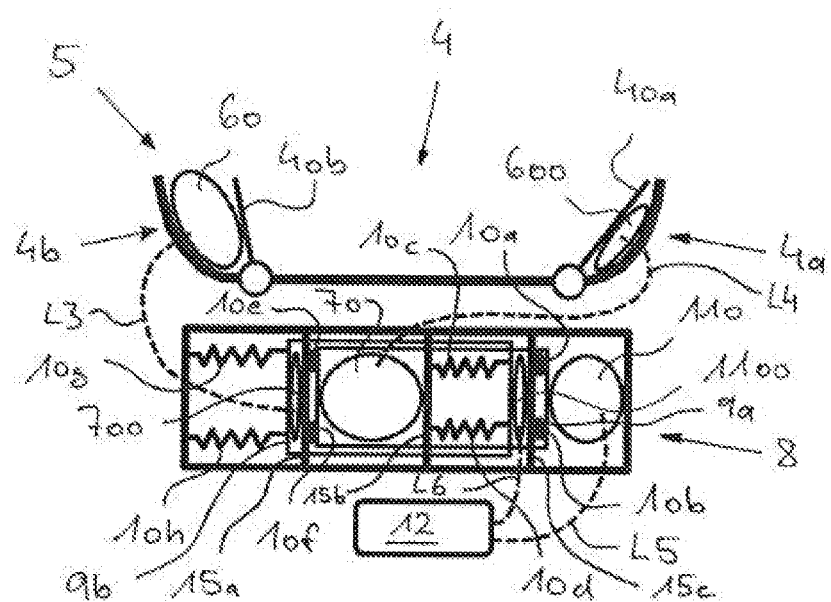

FUNCTIONAL APPARATUS FOR A VEHICLE SEAT, AND CORRESPONDINGLY EQUIPPED SEAT SYSTEM

CROSS REFERENCE TO RELATED APPLICATIONS

This patent application claims priority on and the benefit of German Patent Application No. 10 2020 119 769.1 having a filing date of 27 Jul. 2021.

BACKGROUND OF THE INVENTION

Technical Field

The invention relates to a functional apparatus for a vehicle seat comprising at least one expansion member having at least one cavity, the volume of which can be changed, at least in part, by a fluid which can flow into and out of said cavity, a fluid reservoir comprising at least one cavity being provided, which cavity is connected in a fluid-conducting manner to the cavity of the expansion member, and to a seat system comprising at least one such functional apparatus comprising at least one expansion member having at least one cavity, the volume of which can be changed, at least in part, by a fluid which can flow into and out of said cavity, a fluid reservoir comprising at least one cavity being provided, which cavity is connected in a fluid-conducting manner to the cavity of the expansion member.

Prior Art

In particular, vehicle seats sometimes comprise at least one functional apparatus which can be operated by means of a fluid pressure. These extend for example from the ergonomic adjustability thereof as far as autonomous support during travel in the case of direction change, for example at corners. In addition to electrical actuators, fluid-operated expansion members, for example expansion members which are controllable by hydraulic or pneumatic pressure, are also used for this purpose. An expansion member of this kind, also referred to as a "balloon," comprises at least one cavity which is as fluid-tight as possible, the desired volume change of which is based on filling and emptying.

The compressor, which serves to build up the necessary fluid pressure, can be positioned for example within or outside of the seat. The connection to the expansion member (s) is usually achieved by means of tubes that are connected to the compressor in a fluid-conducting manner.

Irrespective thereof, passive expansion members are sometimes also used in seats of this kind, the multipart structure of which allows for corresponding distribution of a fluid volume caught in said member.

For example, US 2016/0236597 A1 discloses a vehicle seat comprising a cushion, the cover of which defines the seat surface of a seat part having a flexible central region and a flexible front edge region. A compressible central balloon is arranged under the central region, which balloon is connected in a fluid-conducting manner to an edge balloon positioned below the front edge region. A defined amount of a flowable medium, which can be transferred, in part, between the edge balloon and the central balloon, is located within the edge balloon. In order for example to increase the cargo capacity of a trunk adjacent to the vehicle seat, a backrest of the vehicle seat is correspondingly foldably mounted on the seat part thereof. During the folding procedure, the backrest can be folded out beyond the level of the front edge region, in that upon reaching the front edge region the edge balloon thereof is compressed, at least in part. In this case, the excess flowable medium escapes into the central balloon, such that a reversible change in the contour of the cushion results.

DE 10 2009 034 987 A1 also discloses a vehicle seat which has a seat part and a backrest part which is pivotably arranged on the seat part. A multipart cavity is arranged in the seat part, which cavity has a first partial cavity located in the region of the backrest part, and a second partial cavity located in the region of a front edge of the seat part.

The two partial cavities are connected to one another in a fluid-conducting manner by means of a flow channel. In addition to improved seating comfort, the fluid exchange between the partial cavities assists the folding down of the backrest part, as broadly as possible, with corresponding shape change of the seat part.

FR 2 875 451 A1 discloses cushioning for a motor vehicle seat which comprises a foam body that is covered with a cover. At least one volume-change means is arranged in the foam body, which means allows for an external contour change of the foam body. In an active position of the volume-change means, the foam body is raised in regions, whereas in an inactive position of the volume-change means said body is lowered again. The volume-change means may be a multipart expansion member, the defined amount of fluid of which can be transferred between the parts of the expansion member that are connected in a fluid-conducting manner. As a result, folding of the motor vehicle seat which is as compact as possible can be achieved when the backrest thereof is tilted.

US 2017/0066350 A1 discloses a vehicle seat assembly comprising a seat which comprises a seat balloon arranged between a support and a seating surface. Furthermore, a rigid container having a resilient reservoir received therein is provided, which is connected to the seat balloon in a fluid-conducting manner. In the unloaded state of the seat, an excess pressure is applied to the seat balloon, the fluid being able to be displaced out of the seat balloon and into the resilient reservoir, at least in part, by means of loading of the seat balloon by a person, whereupon pressure is applied to said reservoir.

The weight-dependent level change of the seat surface, achievable in this way, ensures that the hip region of a seated person can be brought into an ideal position relative to parts of the seat.

In particular the active influencing of the fluid volume of an expansion member allows for targeted shape changes of individual seat regions. Furthermore, the hardness or the resistance of a seat region of this kind, with respect to a body part of a person loading said seat region, can be set accordingly by adjusting the fluid pressure. On account of the low moved mass thereof and the omission of the transmission typical in the case of actuators based on rotational and/or linear movements, expansion members can themselves be used in an extremely space-saving manner. However, the filling and emptying thereof has a natural inertia. In particular the speed in providing the necessary fluid volume and/or pressure is largely dependent, in this case, on the capacity of the compressor used. High compressor capacities in turn lead to large component dimensions which are subject to specified maximum measurements on account of the only limited available installation space. In view of the weight, in any case components that are as narrow as possible should be used for this purpose. On account of the above-mentioned inertia, functional apparatuses of this kind can be used only to a limited extend in dynamic applications.

BRIEF SUMMARY OF THE INVENTION

The object of the invention is therefore that of developing a functional apparatus comprising at least one expansion member, and a seat system equipped therewith, such that they allow for shorter reaction times.

This object is achieved by a functional apparatus for a seat, in particular vehicle seat, comprising at least one expansion member having at least one cavity, the volume of which can be changed, at least in part, by a fluid which can flow into and out of said cavity, a fluid reservoir comprising at least one cavity being provided, which cavity is connected in a fluid-conducting manner to the cavity of the expansion member, characterized in that the fluid reservoir cooperates with an actuator assembly by means of which the cavity of the fluid reservoir can be actively compressed, with at least partial displacement of the fluid contained therein into the cavity of the expansion member, and a seat system comprising a seat, in particular vehicle seat, and at least one functional apparatus as taught herein. Advantageous embodiments can be found in the dependent claims.

According to the invention, a functional apparatus for a vehicle seat is provided, which apparatus comprises at least one expansion member having at least one cavity. The volume of said cavity is variable, at least in part, by a fluid which can flow into said cavity and out thereof. Furthermore, a fluid reservoir is provided which likewise comprises at least one cavity. The cavity of the fluid reservoir and the cavity of the expansion member are connected to one another in a fluid-conducting manner.

According to the invention, the fluid reservoir cooperates with an actuator assembly, by means of which the cavity of the fluid reservoir can be actively compressed, at least in part. The compression then takes place together with at least partial displacement of the fluid contained therein into the cavity of the expansion member.

The advantage resulting therefrom is to be considered that of it now being possible to manipulate the expansion member independently of the capacity of a compressor. The displacement of the fluid volume, held in at least one of the cavities, between the fluid reservoir and the expansion member thus makes it possible to achieve extremely quick reaction times. On account of the cavities which virtually communicate with one another, an only partial compression of the fluid reservoir already has a direct effect on the expansion member. In addition to the influencing of the volume of the expansion member, the internal pressure in the cavity thereof can also be changed thereby.

As a result, even highly dynamic applications can be achieved, which are independent of the delivery capacity of a compressor.

According to a preferred development of the fundamental inventive concept, the actuator assembly can comprise at least one preload means. In this case, the preload means is designed and/or arranged such that a force, which can be accumulated therein, can be applied at least indirectly to the fluid reservoir. As required, at least some of the force required for compressing the fluid reservoir can be provided by the preload means. The time in which no active compression and/or an opposing movement, for relieving the pressure reservoir, is/are required can advantageously be used to further build up the force which can be accumulated in the preload means, and/or to re-establish, at least in part, a force component already delivered.

A variant for the preload means of the actuator assembly can be designed such that it comprises at least one spring element, or is designed as such. Within the context of the invention, a spring element is understood to be any embodiment which is capable of reversibly changing its shape and/or its length and/or its pressure, for example, counter to the resistance thereof, by way of an external force effect. In any case, the spring element is designed such that a force previously acting thereon can be accumulated, at least in part. The spring element can preferably be for example a helical spring or a coil spring, or a torsional spring, or a spring plate (in each case made of plastics material).

Combinations of at least two of the mentioned variants are also conceivable. Of course, the spring element can, alternatively or in addition, contain a compressible medium in the form of a gas and/or an elastomer and/or another material which can resiliently change shape.

In principle it is possible for the actuator assembly to be of a design by means of which the compression of the cavity of the fluid reservoir can be carried out exclusively by the force thereof which can be accumulated in the preload means. Alternatively thereto, the actuator assembly can also be designed such that the compression of the cavity of the fluid reservoir can be merely assisted by the force which can be accumulated in the preload means. According to the last-mentioned variant, the actuator assembly can, in this respect, comprise at least one further drive which can apply at least the remaining component of required force. A drive of this kind can for example be driven electrically and/or hydraulically and/or pneumatically.

According to a particularly preferred development, the actuator assembly can comprise at least one expandable tensioning balloon, by means of which the pressure force which can be accumulated in the preload means can be built up, at least in part. The tensioning balloon can be for example pneumatically and/or hydraulically driven. On account of the expandable property thereof, it is possible to displace at least a portion of the actuator assembly, such that the mechanical work of the tensioning balloon can be accumulated, at least in part, in the preload means thereof, in the form of a force.

Particularly preferably, the fluid reservoir of the functional apparatus according to the invention can be incorporated, at least in part, between at least two transmission parts of the actuator assembly which are movable relative to one another. Alternatively thereto, the fluid reservoir can also be incorporated between a support region, which is for example fixed relative thereto, and a transmission part of the actuator assembly which is movable relative to the support region. The support region can of course also be formed by a correspondingly fixed transmission part or can comprise a fixed transmission part. In any case, it is thus possible to use at least one movable transmission part of the actuator assembly in order to compress the fluid reservoir purely mechanically, at least in part. It is preferably also possible for one, in particular the above-mentioned, tensioning balloon to also be incorporated, in this manner, between the movable transmission parts or a movable transmission part and the fixed support region (or a correspondingly fixed transmission part). Depending on the design and/or mounting of the transmission part(s) of the actuator assembly, an advantageous lever action can result, in order to apply the force which can be accumulated in the preload means, and/or the force serving to compress the fluid reservoir.

According to an advantageous embodiment of the invention, the functional apparatus thereof can comprise at least two expansion members, each having an associated fluid reservoir. In this case, at least one in particular lever-like transmission part of the actuator assembly, designed for applying the pressure force, can be pivotably incorporated between the two fluid reservoirs such that, depending on the pivot direction of the transmission part, the pressure force can be applied either to one fluid reservoir or to the other fluid reservoir. In other words, in this case the transmission part of the actuator assembly can act as a type of rocker, such that, depending on the relevant orientation about the pivot point thereof, just one fluid reservoir is mechanically loaded, while the other, in each case, is unloaded.

It is conceivable for the actuator assembly of the functional apparatus according to the invention to comprise at least two, in particular lever-like, transmission parts for applying the necessary pressure force, at least in part, which transmission parts can be pivotably and/or displaceably incorporated between the two fluid reservoirs, at least in part. In this case, each of said transmission parts is associated with one of the fluid reservoirs, respectively, it being possible for the at least one preload means to be located between said transmission parts and/or to be operatively connected to at least one of the transmission parts. In this case, the transmission parts can for example comprise a separate pivot bearing in each case, or a common pivot point. Alternatively thereto, at least one of the transmission parts can also be mounted in a linearly displaceable manner, for example.

Preferably, the actuator assembly can comprise a releasable locking mechanism which in particular cooperates with at least one transmission part of the actuator assembly. The locking mechanism can be designed and/or arranged such that triggering it makes it possible for the force accumulated in the preload means to be applied to the fluid reservoir. In this way, almost immediate application of the force, accumulated in the preload means, to the fluid reservoir is possible.

The functional apparatus according to the invention, now presented, allows for quick reaction times, which allows for the use thereof even in highly dynamic applications.

Furthermore, the invention is directed to a seat system which comprises a seat having at least one functional apparatus according to the invention. The seat can preferably be a vehicle seat or generally a seat in a vehicle, which also includes a bench seat for example.

The functional apparatus can for example be a lateral support in the region of the sides of the seat, such as in the cheeks of the seat part thereof and/or of the back part.

The advantages resulting from the seat system according to the invention have already been explained in greater detail in connection with the functional apparatus according to the invention, and therefore in order to avoid repetitions reference is made at this point to the corresponding statements in this respect.

BRIEF DESCRIPTION OF THE DRAWINGS

The invention will be explained in greater detail in the following with reference to the embodiments shown in FIGS. 1 to 15, in which:

FIG. 14 is a cross section of a part of the seat system from FIG. 1, together with a seventh variant of the functional apparatus according to the invention in a first state; and FIG. 15 is a similar view of the seat system from FIG. 14, in a second state of the seventh variant of the functional apparatus thereof.

DETAILED DESCRIPTION OF PREFERRED EMBODIMENTS

Figure 1:
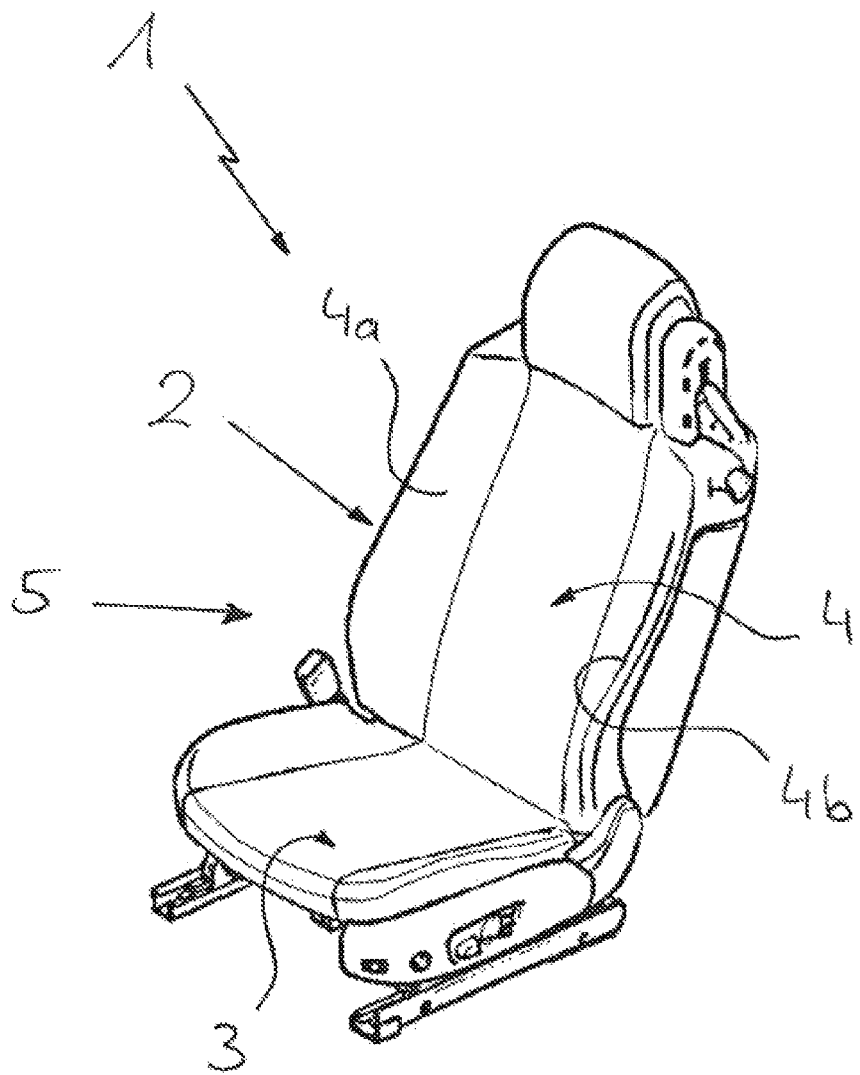
FIG. 1 is a perspective view of a seat system according to the invention comprising a functional apparatus according to the invention.

FIG. 1 is a perspective view of a seat system 1 according to the invention. The seat system 1 comprises a seat 2 which has a seat part 3 and a backrest 4 that is pivotably arranged on the seat part 3. In the present case, purely by way of example, the seat 2 is a single vehicle seat. In a manner not shown, the seat 2 can also be any other form of seat, in particular for a vehicle, such as a bench seat.

In the present case the seat system 1 comprises a functional apparatus 5 according to the invention (initially not visible in greater detail) which, in the case shown here, serves, merely by way of example, for manipulation of the lateral support of a seated person (not shown here) with respect to the two sides 4a, 4b of the backrest 4. Within the context of the invention, a fundamental suitability of the functional apparatus 5 according to the invention for alternative or additional formation of at least one further function, such as for the ergonomic adjustability and/or for establishing a massage function, is considered as given. In a manner which cannot be identified in further detail, the functional apparatus 5 shown here allows for the reversible contour change, at least in regions, of the sides 4a, 4b. Furthermore, as a result the level of support, in particular during cornering, can also be adjusted, in that the resistance of the sides 4a, 4b or the hardness thereof can be set with respect to a body part of the seated person loading it.

Figure 2:
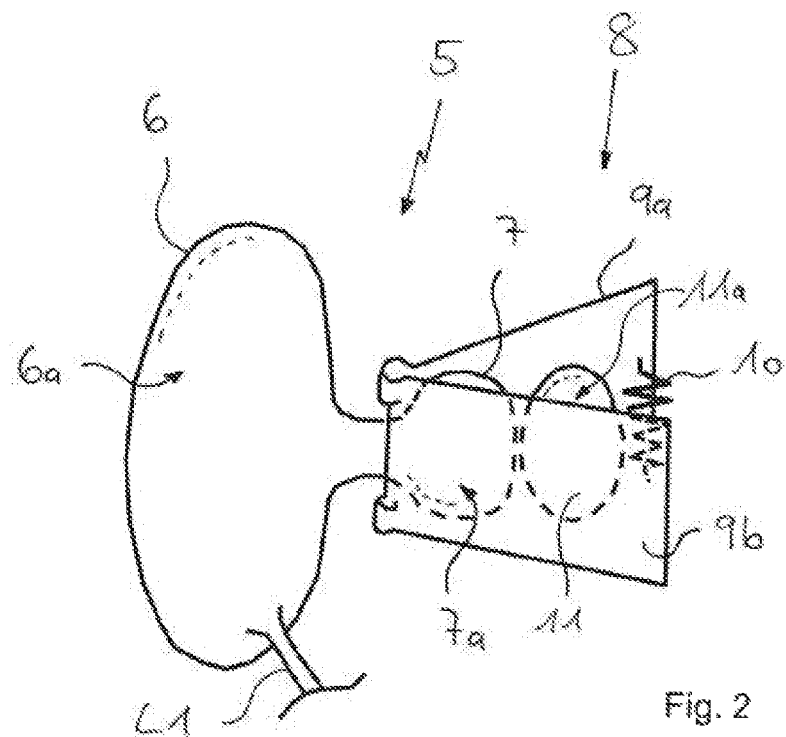
FIG. 2 is a first view of a first variant of the functional apparatus according to the invention.

The fundamental principle of the functional apparatus 5 according to the invention can be seen in FIG. 2. The functional apparatus 5 comprises at least one expansion member 6 as well as a fluid reservoir 7. Both the expansion member 6 and the fluid reservoir 7 in each case comprise at least one cavity 6a, 7a which are connected to one another in a fluid-conducting manner. The fundamental concept behind the connection of the cavities 6a, 7a is that a volume of a fluid, such as air, present in the expansion member 6 and the fluid reservoir 7 is displaceable between the cavities 6a, 7a thereof. In this case, the expansion member 6 serves for the actual manipulation, for example of one of the sides 4a, 4b of the seat 2, while the fluid reservoir 7 constitutes a reservoir for a portion of the fluid volume.

The fluid reservoir 7 clearly cooperates with an actuator assembly 8 which, in the present case, comprises two hingedly interconnected transmission parts 9a, 9b and a preload means 10 extending therebetween in the region of the free ends thereof. Purely by way of example, and in order to better clarify the effect thereof, in the embodiment shown here the preload means 10 is designed as a spring element 10a in the form of a helical spring. The fluid reservoir 7 is incorporated between the two transmission parts 9a, 9b of the actuator assembly 8 such that a force compressing the fluid reservoir 7, at least in part, can be applied to said parts by means of the possible pivot movement thereof relative to one another. Consequently, it is thus possible for at least some of the fluid volume located in the cavity 7a of the fluid reservoir 7 to be displaced into the cavity 6a of the expansion member, and vice versa. The volume of the expansion member 6 can be changed accordingly, by way of the fluid which can thus flow out of the fluid reservoir 7 and into the cavity 6a, at least in part, and out of said cavity in the direction of the fluid reservoir 7. The same applies for the hardness of the expansion member 6, which increases as the fluid pressure increases, whereas it reduces again as the fluid pressure in the cavity 6a of said expansion member decreases.

A tensioning balloon 11, which is in turn expandable at least in regions, and in this respect variable in volume, is also incorporated between the two transmission parts 9a, 9b of the actuator assembly 8. The expansion possibility of the tensioning balloon 11 is based on filling a cavity 11a of the tensioning balloon 11 with a fluid, such as air. For this purpose, the cavity 11a of the tensioning balloon 11 can be connected in a fluid-conducting manner, in a way not shown, such as via a line, to a compressor or an interposed valve assembly. In contrast, what is shown is the supply of the expansion member 6 with fluid via a line L1 which is connected thereto in a fluid-conducting manner, and which can likewise be connected in a fluid-conducting manner to the or a compressor or the or an interposed valve assembly.

With regard to the mode of operation, the preload means 10 can be stretched for example, counter to the restoring force thereof, by an expansion of the tensioning balloon 11, whereupon the fluid reservoir 7 obtains sufficient space between the transmission parts 9a, 9b, in this case pivoting relatively away from one another, of the actuator assembly 8, in order to receive, in the cavity 7a thereof, a quantity of fluid out of the cavity 6a of the expansion member 6 and/or a quantity of fluid flowing into the cavity 6a of the expansion member 6 via the line L1. The spacings of the transmission parts 9a, 9b of the actuator assembly 8 and the size of the fluid reservoir 7 are advantageously selected such that the transmission parts 9a, 9b are always in contact, at least in regions, with the fluid reservoir 7. Non-time-critical changes in the volume and/or the hardness of the expansion member 6 can be achieved by fluid flowing back via the line L1. Dynamic changes, in contrast, require rapid changes of the volume and/or of the pressure within the cavity 6a of the expansion member 6.

As a result of the preload means 10 stretched counter to the restoring force thereof, a force is available which, in the case of at least partial emptying of the cavity 11 of the tensioning balloon 11, leads directly to an at least partial compression of the fluid reservoir 7. The high speed of the quantity of fluid which is thus displaceable into the cavity 6a of the expansion member 6 makes it possible for said member to be brought, within a very short time, to the desired volume and/or the required hardness, by increasing the fluid pressure within the cavity 6a thereof.

In the embodiment shown here, the possible compression of the fluid reservoir 7 is based exclusively on the force accumulated in the preload means 10. Of course, the functional apparatus 5 can also be such that the preload means 10 acts merely in an assisting manner and for example merely supplements the force from a drive (not visible in greater detail here).

Figure 3:
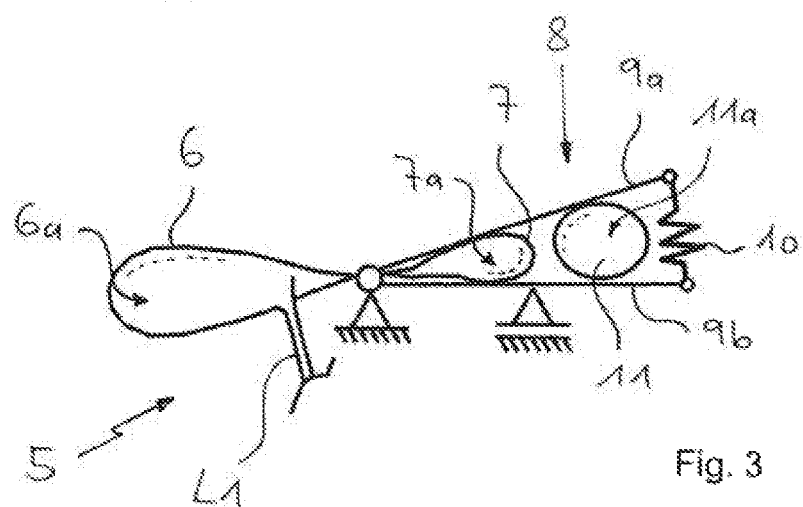
FIG. 3 is a second view of the functional apparatus from FIG. 2.

FIG. 3 is an amended view of the functional apparatus 5 from FIG. 2. This again makes clear the position of the fluid reservoir 7 and of the tensioning balloon 11 between the two transmission parts 9a, 9b of the actuator assembly 8. As can be seen from the schematic indication of a fixed bearing and a displaceable bearing (see triangles), in this case one transmission part 9b can be mounted, while the other transmission part 9a is pivotable relative thereto.

Figure 4:
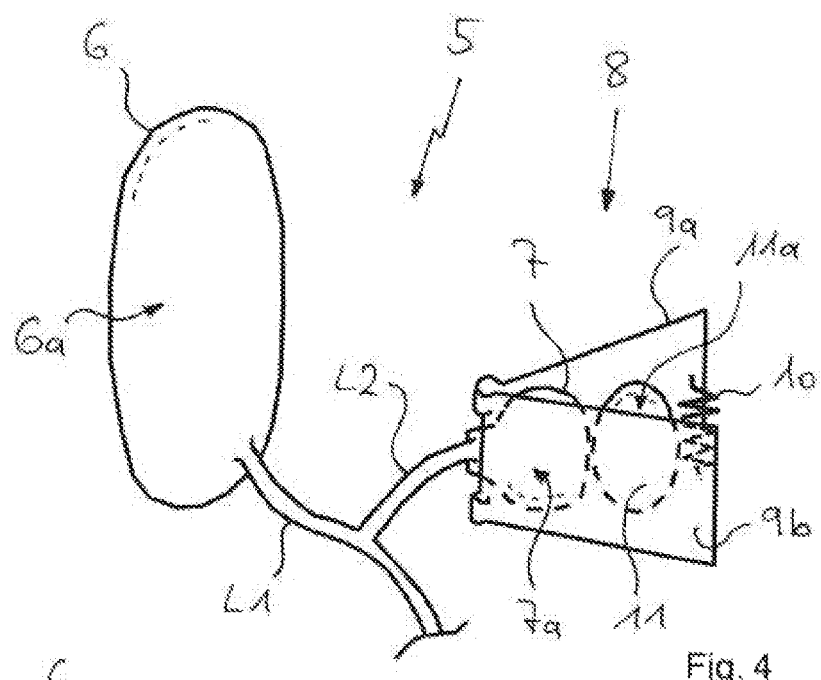
FIG. 4 is a first view of a second variant of the functional apparatus according to the invention.

A second variant of the functional apparatus 5 from FIG. 2 can be seen in FIG. 4. In contrast to the first variant from FIG. 2, in this case the expansion member 6 and the fluid reservoir 7 are spaced further apart from one another, the fluid-conducting connection between the cavities 6a, 7b thereof being achieved via a further line L2. For this purpose, the second line L2 is connected in a fluid-conducting manner to the line L1 in the form of a branch. As a result, the cavity 7a of the fluid reservoir 7 can thus be filled with fluid directly via the further line L2, whereas the filling thereof in the first variant (see FIG. 2 and FIG. 3) is achieved via the cavity 6a of the expansion member 6.

Figure 5:
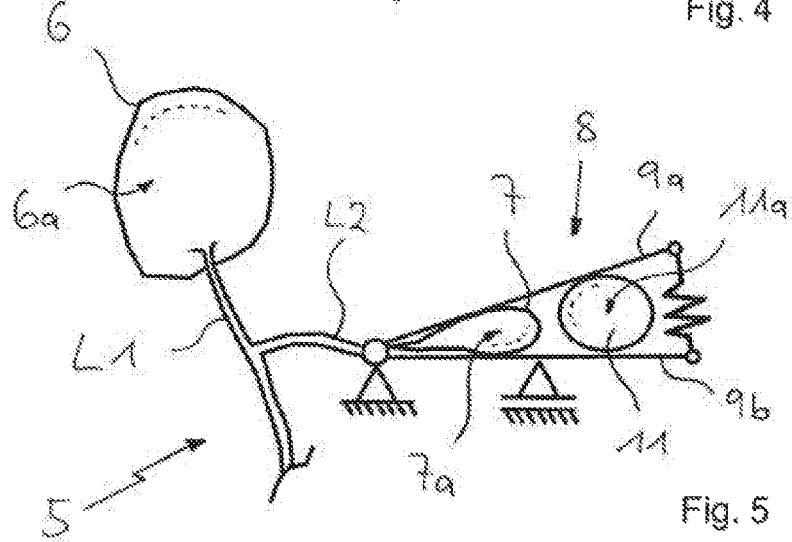
FIG. 5 is a second view of the functional apparatus from FIG. 4.

FIG. 5 corresponds to the manner of representation in FIG. 3, now showing, however, the second variant of the functional apparatus 5 from FIG. 4, which differs from the first variant in particular by the further line L2.

Figure 6:
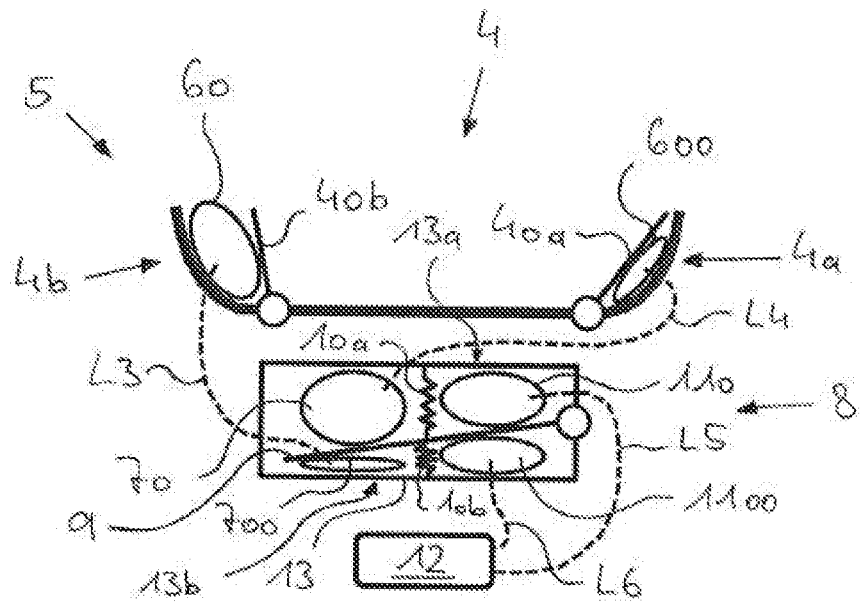
FIG. 6 is a cross section of a part of the seat system from FIG. 1, together with a third variant of the functional apparatus according to the invention in a first state.

FIG. 6 illustrates a case of use of the functional apparatus 5 according to the invention for the backrest 4 of the seat 2 from FIG. 1, as a third possible variant. It is clear that a first expansion member 60 is arranged in the first side 4a thereof, and a further second expansion member 600 is arranged in the second side 4b thereof. In the present case, a cover and/or cushion, which is typically stretched over the respective expansion member 60, 600, is indicated by a covering 40a, 40b in each case. Beyond the actuator assembly 8, the functional apparatus 5 comprises a compressor 12 which may comprise a valve assembly (not shown in greater detail). As is visible, the first expansion member 60 is connected in a fluid-conducting manner to a first fluid reservoir 70, via a first line L3, while the second expansion member 600 is connected in a fluid-conducting manner to a second fluid reservoir 700, via a second line L4. Both fluid reservoirs 70, 700 are arranged, together with two tensioning balloons 110, 1100, inside a housing 13 which is closed at least in part. A single, in particular lever-like, transmission part 9 is pivotably mounted inside said housing 13 in such a way as to extend between the two opposing expansion members 60, 600 and the likewise opposing tensioning balloons 110, 1100. In this way, the transmission part 9 is incorporated both between the two expansion members 60, 600 and between the two tensioning balloons 110, 1100. In this respect, the actuator assembly 8 is accommodated inside the housing 13.

Both tensioning balloons 110, 1100 are in each case connected to the compressor 12 in a fluid-conducting manner via one of two lines L5, L6, the first tensioning balloon 110 having a connection to a third line L5, and the second tensioning balloon 1100 having a connection to a fourth line L6. Furthermore, two preload means 10a, 10b are provided, each preload means 10a, 10b of which in each case extends between the transmission part 9 and one of two opposing parts of the housing 13. The parts of the housing 13 serve as support regions 13a, 13b for the two fluid reservoirs 70, 700 and the two tensioning balloons 110, 1100. As a result, each fluid reservoir 70, 700 is in each case incorporated between one of the support regions 13a, 13b and the transmission part 9 which is movable relative thereto. The same applies for the two tensioning balloons 110, 1100 which are likewise in each case incorporated between one of the support regions 13a, 13b and the transmission part 9 which is movable relative thereto.

In this embodiment, too, the transmission part 9 is used for applying the necessary force to the relevant fluid reservoir 70, 700. On account of the pivotable mounting of the transmission part 9, the force from the transmission part 9 can be applied alternately either to the first fluid reservoir 70, or to the second fluid reservoir 700.

In the present case, the second tensioning balloon 1100 is emptied, at least in part, with respect to the fluid volume thereof, whereupon the transmission part, in particular on account of the force bearing thereon from the first preload means 10a (in the form of traction or compression), was pivoted in a direction, such that the second fluid reservoir 700 is compressed. In contrast, the second fluid reservoir 700 has corresponding space for the stretching thereof. As a result, the first expansion member 60, connected to the compressed first fluid reservoir 70, is activated accordingly, while the second expansion member 60, connected to the stretched second fluid reservoir 700, is correspondingly inactive.

In this case, active means that the expansion member 60 has a correspondingly large volume and/or a correspondingly high internal pressure. In contrast, inactive means that the expansion member 600 has a comparatively smaller volume and/or a comparatively lower internal pressure.

Figure 7:
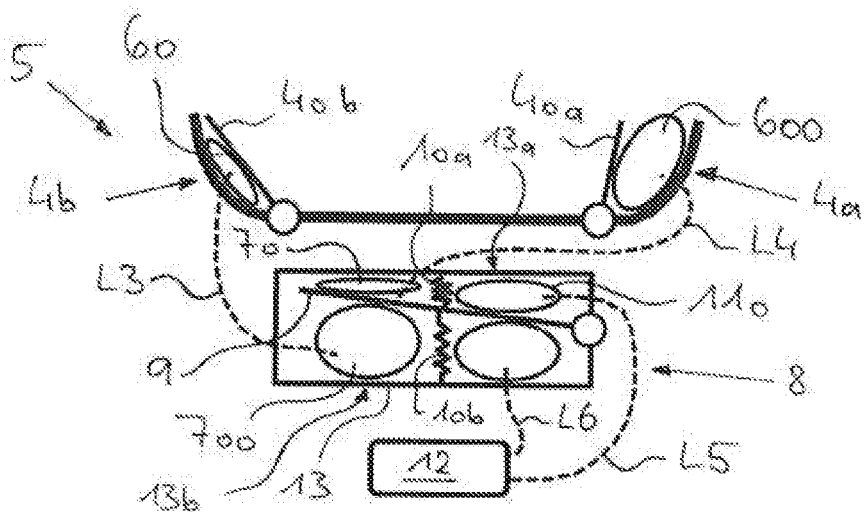
FIG. 7 is a similar view of the seat system from FIG. 6, in a second state of the third variant of the functional apparatus thereof.

FIG. 7 shows a virtual reversal of the state of the functional apparatus 5 visible in FIG. 6, in which the second expansion member 600 is now activated, while the first expansion member 60 is in an inactive state. Said state is based on pivoting of the transmission member 9 in the opposite direction, in that the first tensioning balloon 110 was emptied, at least in part, with respect to the fluid volume thereof. This embodiment of the functional apparatus 5 makes it possible for an alternating actuation of the two expansion members 60, 600 to be achieved.

In principle, the force bearing on the relevant transmission part 9, 9a, 9b from at least one of the preload means 10, 10a, 10b can be assisted by corresponding application of pressure to the or one of the two tensioning balloons 11, 110, 1100.

Figure 8:
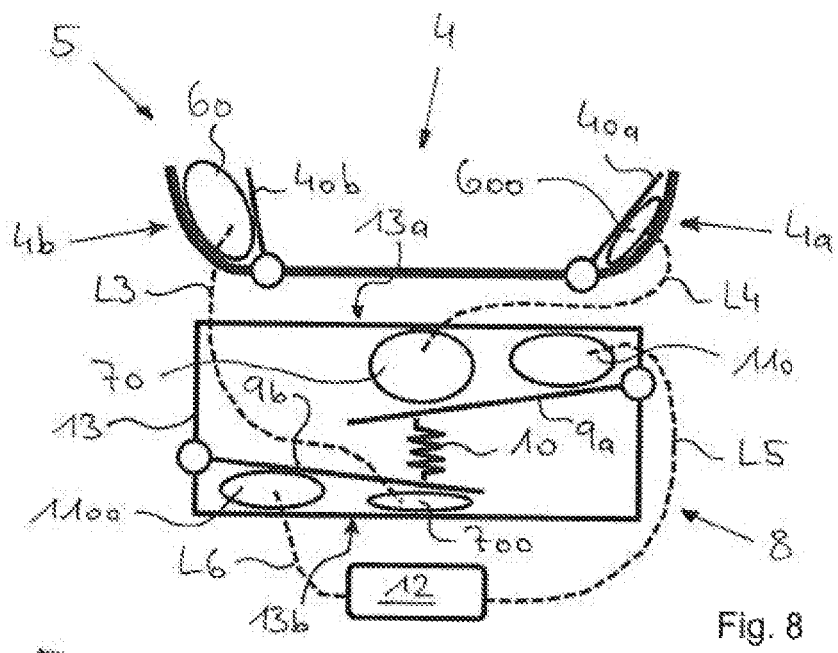
FIG. 8 is a cross section of a part of the seat system from FIG. 1, together with a fourth variant of the functional apparatus according to the invention in a first state.

A further fourth variant of the functional apparatus 5 can be seen in FIG. 8. In contrast to the third variant from FIG. 6 and FIG. 7, the actuator assembly 8 thereof now comprises two transmission parts 9a, 9b which are pivotably mounted on opposing sides of the housing 13. A preload means 10 is incorporated between the two transmission parts 9a, 9b. The arrangement of the fluid reservoirs 70, 700 and the tensioning balloons 110, 1100 substantially corresponds to the third variant of the functional apparatus 5 shown in FIG. 6 and FIG. 7, with the difference that the first fluid reservoir 70 and the first tensioning balloon 110 are now incorporated together between the first transmission part 9a and a first support region 13a, while the second fluid reservoir 700 and the second tensioning balloon 1100 are incorporated together between the second transmission part 9b and a second support region 13b.

In the present case, the second tensioning balloon 1100 is emptied, at least in part, whereupon the second transmission part 9b, in particular on account of the force from the preload means 10, was pivoted in the direction of the second support region 13b. Consequently, at least some of the fluid present in the second fluid reservoir 700 was displaced into the first expansion member 60 and said member was activated in this respect. Since the first tensioning balloon 110 still retains the fluid volume or fluid pressure thereof, the first transmission part 9a, to which the force from the preload means 10 is also applied, remains in the orientation thereof.

As soon as the first tensioning balloon 110 is emptied, at least in part, the first transmission part 9a is also displaced in the direction of the first support region 13a, whereupon the fluid volume present in the first fluid reservoir 70 is displaced into the second expansion member 600, at least in part.

The embodiment of the functional apparatus 5 visible here allows for both alternating and mutually separated actuation of the two expansion members 60, 600. The basis for this is the mechanical decoupling of the two transmission parts 9a, 9b and the separate pivotability thereof, possible in this respect.

Figure 9:
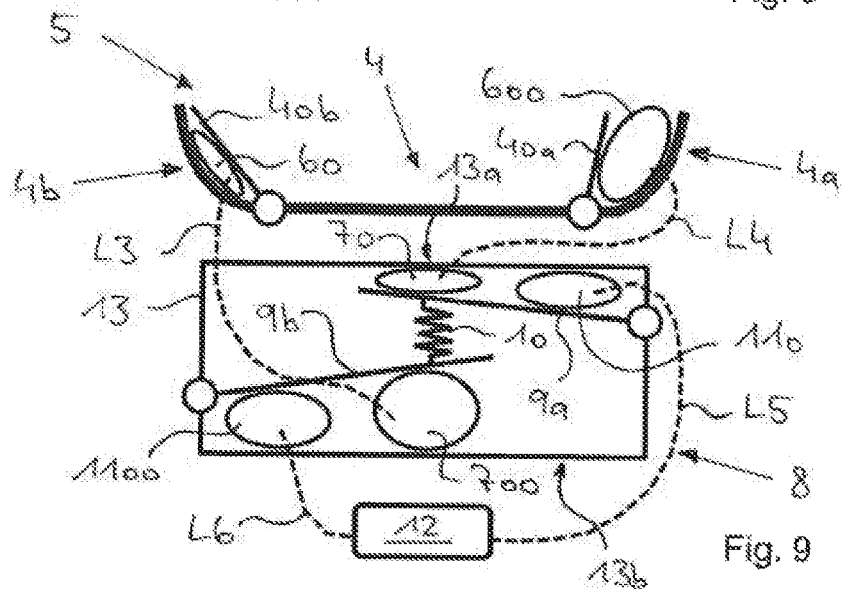
FIG. 9 is a similar view of the seat system from FIG. 8, in a second state of the fourth variant of the functional apparatus thereof.

On the basis of FIG. 7, FIG. 9 shows a virtual reversal of the state of the functional apparatus 5 visible in FIG. 8, in which here, too, the second expansion member 600 is activated, while the first expansion member 60 is in an inactive state. Said state is based on pivoting of the two transmission parts 9a, 9b in the opposite direction in each case.

Figure 10:
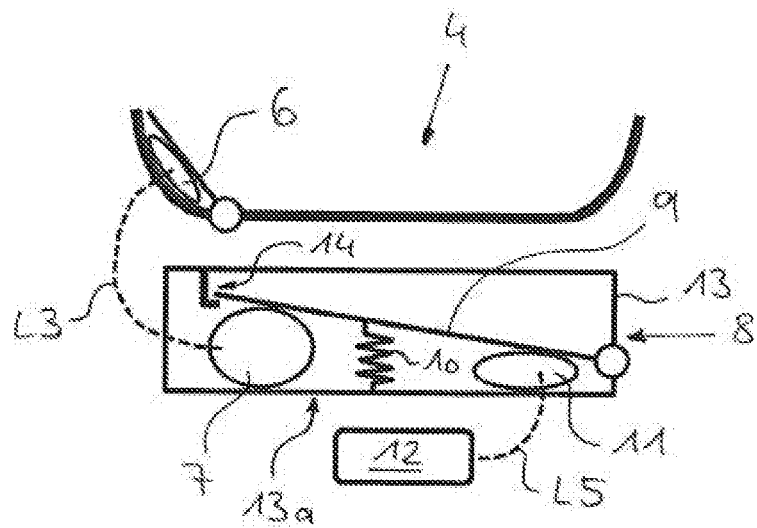
FIG. 10 is a cross section of a part of the seat system from FIG. 1, together with a fifth variant of the functional apparatus according to the invention in a first state.

FIG. 10 shows a fifth variant of the functional apparatus 5 according to the invention, in the sense of a schematic drawing. For reasons of clarity, said drawing is reduced to just one single expansion member 6 and one single fluid reservoir 7, connected thereto via a line L3, in a fluid-conducting manner, within the housing 13. As can be seen, in this case the actuator assembly 8 comprises a single transmission part 9 which is pivotably mounted on the housing 13, the fluid reservoir 7, together with a tensioning balloon 11, being incorporated between the transmission part 9 and a support region 13a.

In this variant, the actuator assembly 8 comprises a releasable locking mechanism 14 which cooperates with the transmission part 9. In this case, the preload means 10, extending between the support region 13a and the transmission part 9, is designed such that it exerts a tractive force on the transmission part 9. The transmission part 9 was pivoted towards the locking mechanism 14, by means of application of pressure to the tensioning balloon 11 via the line L5 by means of the compressor 12, and is held in position by said locking mechanism. In this state, the tensioning balloon 11 can be emptied, at least in part, since the locking mechanism 14 prevents pivoting of the transmission part 9 in the opposing direction, resulting on account of the tractive force of the preload means 10. It is clear that the fluid reservoir 7 has sufficient space, in this state, to expand accordingly by being filled with fluid. It is furthermore clear that the expansion member 6 is inactive in the present case.

Figure 11:
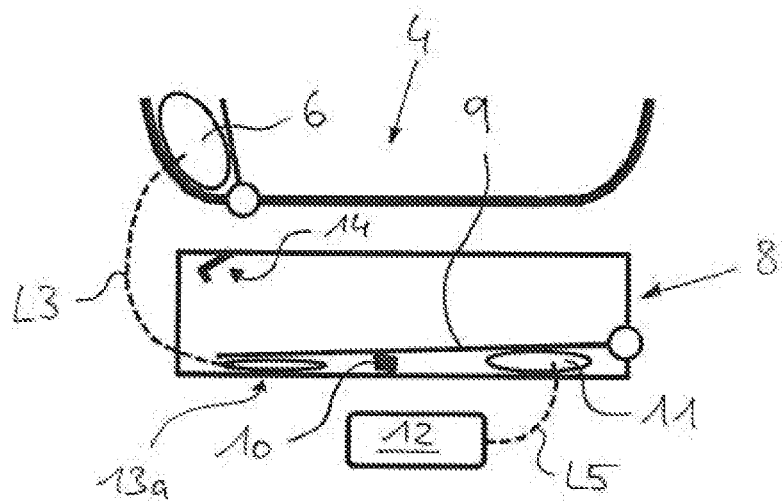
FIG. 11 is a similar view of the seat system from FIG. 10, in a second state of the fifth variant of the functional apparatus thereof.

FIG. 11 illustrates the state of the functional apparatus 5 following release of the locking mechanism 14. Since the transmission part 9 was no longer held in the position thereof, it was pivoted, on account of the tractive force from the preload means 10, in particular suddenly, in the direction of the support region 13a. As a result, the fluid reservoir 7 was compressed accordingly, whereupon the fluid volume displaced in the process was conducted out of the fluid reservoir 7 and into the expansion member 6, for the purpose of the activation thereof.

Figure 12:
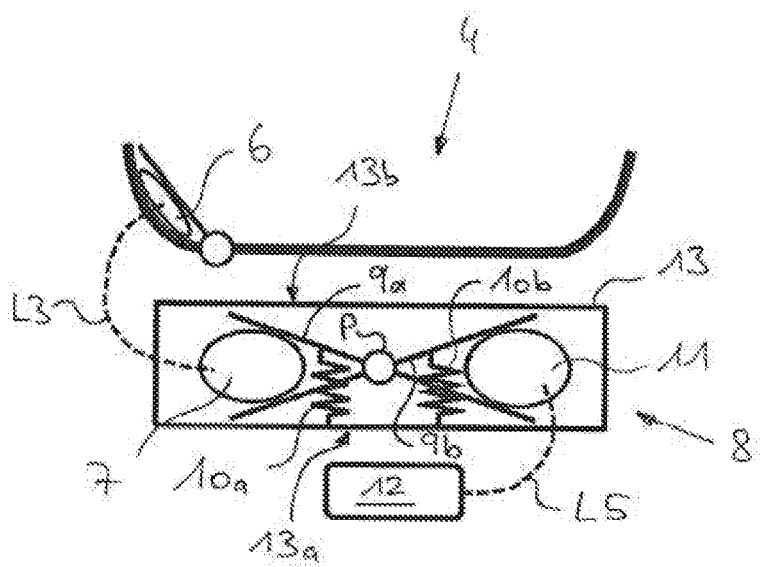
FIG. 12 is a cross section of a part of the seat system from FIG. 1, together with a sixth variant of the functional apparatus according to the invention in a first state.

FIG. 12 shows, in a likewise reduced schematic drawing, a sixth variant of the functional apparatus 5 according to the invention, the actuator assembly 8 of which comprises two transmission parts 9a, 9a which comprise a common pivot point P in a quasi-intersecting position. In other words, the two transmission parts 9a, 9b are pivotable about the pivot point P in the sense of a hinge pin. In the two regions, open towards the outside, between the transmission parts 9a, 9b, the fluid reservoir 7 is incorporated on one side, and the tensioning balloon 11 is incorporated on the other side, between the transmission parts 9a, 9b. In other words, the fluid reservoir 7 and the tensioning balloon 11 are not in contact with the support regions 13a, 13b. The support regions 13a, 13b serve as a bearing for two preload means 10a, 10b, of which the first preload means 10a extends between the first support region 13a and the first transmission part 9a, while the second preload means 10b extends between the second support region 13b and the second transmission part 9b. The two preload means 10a, 10b exert a tractive force on one of the two transmission parts 9a, 9b, respectively, by means of which the first transmission part 9a is pivotable, here purely by way of example in the counter-clockwise direction, and the second transmission part 9b is accordingly pivotable in the clockwise direction, about the pivot point P. In the orientation shown here, the two transmission parts 9a, 9b are supported, merely by way of example, on the first support region 13a. In principle, the preload means 10a, 10b can also be arranged in any other possible orientation and/or be connected to the transmission parts 9a, 9b, in order to exert the necessary force, in the required direction, on the transmission parts 9a, 9b. According to an alternative embodiment (not shown here), one of the transmission parts 9a, 9b can also be fixed, and in this respect itself form a support region, while the other transmission part 9a, 9b remains pivotable. In this connection, just one preload means 10a, 10b, or if required also both preload means 10a, 10b, could be coupled to the movable transmission part 9a, 9b. Since fluid pressure from the compressor 12 can be applied to the tensioning balloon 11 via the line L5, the transmission parts 9a, 9b remain in the position thereof. In said position, the fluid reservoir 7 has sufficient space to expand.

Figure 13:
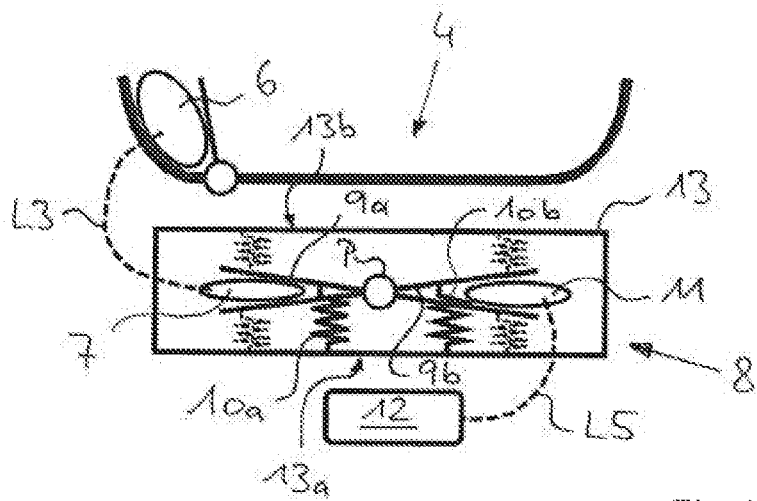
FIG. 13 is a similar view of the seat system from FIG. 12, in a second state of the sixth variant of the functional apparatus thereof.

FIG. 13 shows the state of the functional apparatus 5 following draining of the fluid out of the tensioning balloon 11, at least in part. Subsequently, the two transmission parts 9a, 9b were pivoted relative to one another such that the fluid reservoir 7 incorporated therebetween was compressed, and activated the expansion member 6 connected thereto in a fluid-conducting manner via the line L3.

The components within the housing 13, indicated in dashed lines, show at least one further variant for the use of preload means with respect to the possible arrangement and/or design thereof.

FIG. 14 and FIG. 15 also show two states of a second variant of the functional apparatus 5 according to the invention. In contrast to the previous variants, said variant comprises two frame-like transmission parts 9a, 9b which are guided in a linearly displaceable manner within the housing 13. The housing 13 has three internal walls 15a-15c which serve in particular as thrust bearings. The two transmission parts 9a, 9b are arranged inside one another, at least in portions; in particular, the first transmission part 9a extends in the second transmission part 9b, at least in part. Two fluid reservoirs 70, 700 are located on a left-hand side, with reference to the view of FIG. 14, beside the central second wall 15b, while two tensioning balloons 110, 1100 are located to the right of the wall 15b. In this case, the first tensioning balloon 110 is positioned between a right-hand outside head region of the first transmission part 9a and the housing 13, while the second tensioning balloon 1100 is arranged between the right-hand third wall 15c and a left-hand outer head region of the second transmission part 9b. With reference to the left-hand side, the first fluid reservoir 70 is located between the central second wall 15b and a left-hand inner head region of the first transmission part 9a, while the second fluid reservoir 700 is located between the left-hand first wall 15a and a left-hand inner head region of the second transmission part 9b. The first transmission part 9a is loaded by a total of four preload means 10a, 10b; 10e, 10f, of which two preload means 10a, 10b extend between the inner right-hand head region of the first transmission part 9a and the right-hand wall 15c, while the remaining two preload means 10e, 10f are located in front of the left-hand outer head region of the first transmission part 9a and are supported on the first wall 15a. The second transmission part 9b is also loaded by a total of four preload means 10c, 10d; 10g, 10h, of which two preload means are supported on the inner right-hand head region of the second transmission part 9b and the central third wall 15b, while the remaining two preload means 10g, 10h extend between the right-hand inner face of the housing 13 and the right-hand outer head region of the second transmission part 9b.

FIG. 14 shows the situation in which the first expansion member 60 is activated, while the second expansion member 600 is in a deactivated state. For this purpose, fluid pressure from the compressor 12 is applied to the first tensioning balloon 110 via the line L5, such that the first transmission part 9a is displaced to the left, in a linear manner, counter to the resistance of the preload means 10a, 10b; 10e, 10f. As a result, the second fluid reservoir 700 was compressed, and the content thereof emptied, at least in part, into the first expansion member 60 which is connected thereto in a fluid-conducting manner, via the line L3. At the same time, the first fluid reservoir 70 has sufficient space for the expansion thereof.

A virtual reversal of the state of the functional apparatus 5 shown in FIG. 14 is visible in FIG. 15. Said reversal is established by emptying of the first tensioning balloon 110, at least in part, whereupon the first transmission part 9a, loaded by the total of four preload means 10a, 10b; 10e, 10f was displaced linearly to the right. Subsequently, the first fluid reservoir 70 was compressed, at least in part, leading to activation of the second expansion reservoir 600 which is connected in a fluid-conducting manner to said first fluid reservoir via the line L4. At the same time or in a time-lagged manner, the second tensioning balloon 1100 was supplied with fluid pressure from the compressor via the line L6, leading to the expansion of said tensioning balloon. As a result, the second transmission part 9b was displaced in a linear manner to the left. The second fluid reservoir 700, which gained space as a result, could thus receive at least some of the fluid from the first expansion member 60 and expand accordingly, leading to the deactivation of the first expansion member 60.

The embodiment of the functional apparatus 5 according to this variant allows for simultaneous or separate actuation of the two expansion members 60, 600 by means of corresponding linear displacement of just one or of both of the transmission parts 9a, 9b.

In principle, the arrangement of the at least one preload means 10a, 10b, proceeding from the above as possible embodiments 10, and described above, is to be considered as being given merely by way of example, since it can of course exert its force on the transmission part 9a, 9b associated therewith, in the form of a tractive force or a pressure force.

LIST OF REFERENCE NUMERALS

1—seat system
2—seat
3—seat part of 2
4—backrest of 2
4a—first side of 4
4b—second side of 4
5—functional apparatus
6—expansion member of 5
6a—cavity of 6
7—fluid reservoir of 5
7a—cavity of 7
8—actuator assembly of 5
9—transmission part of 8
9a—first transmission part of 8
9b—second transmission part of 8
10—preload means of 8
10a—first preload means of 8
10b—second preload means of 8
10c—third preload means of 8
10d—fourth preload means of 8
10e—fifth preload means of 8
10f—sixth preload means of 8
11—tensioning balloon of 8
11a—cavity of 11
12—compressor of 5
13—housing of 5
13a—support region of 13
13b—support region of 13
14—locking mechanism of 8
15a—first wall in 13
15b—second wall in 13
15c—third wall in 13
40a—covering of 4a
40b—covering of 4b
60—first expansion member of 5
70—first fluid reservoir of 5
110—first tensioning balloon of 8
600—second expansion member of 5
700—second fluid reservoir of 5
1100—second tensioning balloon of 8
L1—line
L2—line
L3—first line
L4—second line
L5—third line
L6—fourth line
P—pivot point of 9a and 9b

The invention claimed is:

1. A functional apparatus (5) for a seat (2), in particular vehicle seat, comprising at least one expansion member (6, 60, 600) having at least one cavity (6a), the volume of which can be changed, at least in part, by a fluid which can flow into and out of said cavity, a fluid reservoir (7, 70, 700) comprising at least one cavity (7a) being provided, which cavity is connected in a fluid-conducting manner to the cavity (6a) of the expansion member (6, 60, 600), wherein
the fluid reservoir (7, 70, 700) cooperates with an actuator assembly (8) by means of which the cavity (7a) of the fluid reservoir (7, 70, 700) can be actively compressed, with at least partial displacement of the fluid contained therein into the cavity (6a) of the expansion member (6, 60, 600), and
wherein the actuator assembly (8) comprises at least one preload means (10), by means of which a force which can be accumulated therein can be applied at least indirectly to the fluid reservoir (7, 70, 700).

2. The functional apparatus (5) according to claim 1, wherein the preload means (10) of the actuator assembly (8) comprises at least one spring element (10a) or is designed as such.

3. The functional apparatus (5) according to claim 1, wherein the actuator assembly (8) is designed such that the compression of the cavity (7a) of the fluid reservoir (7, 70, 700) can either be assisted by the force which can be accumulated in the preload means (10) of said reservoir, or can be carried out exclusively by means of the force which can be accumulated in the preload means (10) of said reservoir.

4. The functional apparatus (5) according to claim 1, wherein the actuator assembly (8) comprises at least one expandable tensioning balloon (11, 110, 1100) by means of which the pressure force which can be stored in the preload means (10) can be built up, at least in part.

5. The functional apparatus (5) according to claim 1, further comprising at least two expansion members (60, 600) each comprising an associated fluid reservoir (70, 700), at least one in particular lever-like transmission part (9) of the actuator assembly (8), designed for applying the force, being pivotably incorporated between the two fluid reservoirs (70, 700) such that, depending on the pivot direction of the transmission part (9), the force can be applied to either one fluid reservoir (70) or the other fluid reservoir (700).

6. The functional apparatus (5) according to claim 1, wherein the actuator assembly (8) comprises at least two in particular lever-like transmission parts (9a, 9b) that are pivotably and/or displaceably incorporated, at least in part, between the two fluid reservoirs (70, 700), in each case one transmission part (9a, 9b) of which is associated with one of the fluid reservoirs (70, 700), the preload means (10, 10a-10f) being arranged between the transmission parts (9a, 9b) and/or being operatively connected to at least one of the transmission parts (9a, 9b).

7. The functional apparatus (5) according to claim 1, wherein the actuator assembly (8) comprises a releasable locking mechanism (14) which in particular cooperates with at least one transmission part (9) of the actuator assembly (8), by means of triggering of which the force accumulated in the preload means (10) can be applied to the fluid reservoir (7).

8. A functional apparatus (5) for a seat (2), in particular vehicle seat, comprising at least one expansion member (6, 60, 600) having at least one cavity (6a), the volume of which can be changed, at least in part, by a fluid which can flow into and out of said cavity, a fluid reservoir (7, 70, 700) comprising at least one cavity (7a) being provided, which cavity is connected in a fluid-conducting manner to the cavity (6a) of the expansion member (6, 60, 600), wherein
the fluid reservoir (7, 70, 700) cooperates with an actuator assembly (8) by means of which the cavity (7a) of the fluid reservoir (7, 70, 700) can be actively compressed, with at least partial displacement of the fluid contained therein into the cavity (6a) of the expansion member (6, 60, 600), and wherein the fluid reservoir (7, 70, 700) and/or an expandable tensioning balloon (11, 110, 1100) is incorporated, at least in part, between two transmission parts (9a, 9b) of the actuator assembly (8) which are movable relative to one another, or between a support region (13a, 13b) and a transmission part (9) of the actuator assembly (8) which is movable relative to the support region (13a, 13b).

9. The functional apparatus (5) according to claim 8, wherein the actuator assembly (8) comprises at least one preload means (10), by means of which a force which can be accumulated therein can be applied at least indirectly to the fluid reservoir (7, 70, 700).

10. The functional apparatus (5) according to claim 9, wherein the actuator assembly (8) is designed such that the compression of the cavity (7a) of the fluid reservoir (7, 70, 700) can either be assisted by the force which can be accumulated in the preload means (10) of said reservoir, or can be carried out exclusively by means of the force which can be accumulated in the preload means (10) of said reservoir.

11. A seat system (1) comprising a seat (2), in particular a vehicle seat, and at least one functional apparatus (5) comprising at least one expansion member (6, 60, 600) having at least one cavity (6a), the volume of which can be changed, at least in part, by a fluid which can flow into and out of said cavity, a fluid reservoir (7, 70, 700) comprising at least one cavity (7a) being provided, which cavity is connected in a fluid-conducting manner to the cavity (6a) of the expansion member (6, 60, 600), wherein the fluid reservoir (7, 70, 700) cooperates with an actuator assembly (8) by means of which the cavity (7a) of the fluid reservoir (7, 70, 700) can be actively compressed, with at least partial displacement of the fluid contained therein into the cavity (6a) of the expansion member (6, 60, 600), and wherein the actuator assembly (8) comprises at least one preload means (10), by means of which a force which can be accumulated therein can be applied at least indirectly to the fluid reservoir (7, 70, 700).

12. The seat system (1) according to claim 11, wherein the preload means (10) of the actuator assembly (8) comprises at least one spring element (10a) or is designed as such.

13. The seat system (1) according to claim 11, wherein the actuator assembly (8) is designed such that the compression of the cavity (7a) of the fluid reservoir (7, 70, 700) can either be assisted by the force which can be accumulated in the preload means (10) of said reservoir, or can be carried out exclusively by means of the force which can be accumulated in the preload means (10) of said reservoir.

14. The seat system (1) according to claim 11, wherein the actuator assembly (8) comprises at least one expandable tensioning balloon (11, 110, 1100) by means of which the pressure force which can be stored in the preload means (10) can be built up, at least in part.

15. The seat system (1) according to claim 11, further comprising at least two expansion members (60, 600) each comprising an associated fluid reservoir (70, 700), at least one in particular lever-like transmission part (9) of the actuator assembly (8), designed for applying the force, being pivotably incorporated between the two fluid reservoirs (70, 700) such that, depending on the pivot direction of the transmission part (9), the force can be applied to either one fluid reservoir (70) or the other fluid reservoir (700).

16. The seat system (1) according to claim 11, wherein the actuator assembly (8) comprises at least two in particular lever-like transmission parts (9a, 9b) that are pivotably and/or displaceably incorporated, at least in part, between the two fluid reservoirs (70, 700), in each case one transmission part (9a, 9b) of which is associated with one of the fluid reservoirs (70, 700), the preload means (10, 10a-10f) being arranged between the transmission parts (9a, 9b) and/or being operatively connected to at least one of the transmission parts (9a, 9b).

17. The seat system (1) according to claim 11, wherein the actuator assembly (8) comprises a releasable locking mechanism (14) which in particular cooperates with at least one transmission part (9) of the actuator assembly (8), by means of triggering of which the force accumulated in the preload means (10) can be applied to the fluid reservoir (7).

18. A seat system (1) comprising a seat (2), in particular a vehicle seat, and at least one functional apparatus (5) comprising at least one expansion member (6, 60, 600) having at least one cavity (6a), the volume of which can be changed, at least in part, by a fluid which can flow into and out of said cavity, a fluid reservoir (7, 70, 700) comprising at least one cavity (7a) being provided, which cavity is connected in a fluid-conducting manner to the cavity (6a) of the expansion member (6, 60, 600) wherein the fluid reservoir (7, 70, 700) cooperates with an actuator assembly (8) by means of which the cavity (7a) of the fluid reservoir (7, 70, 700) can be actively compressed, with at least partial displacement of the fluid contained therein into the cavity (6a) of the expansion member (6, 60, 600), and wherein the fluid reservoir (7, 70, 700) and/or an expandable tensioning balloon (11, 110, 1100) is incorporated, at least in part, between two transmission parts (9a, 9b) of the actuator assembly (8) which are movable relative to one another, or between a support region (13a, 13b) and a transmission part (9) of the actuator assembly (8) which is movable relative to the support region (13a, 13b).

19. The seat system (1) according to claim 18, wherein the actuator assembly (8) comprises at least one preload means (10), by means of which a force which can be accumulated therein can be applied at least indirectly to the fluid reservoir (7, 70, 700).

20. The seat system (1) according to claim 19, wherein the actuator assembly (8) is designed such that the compression of the cavity (7a) of the fluid reservoir (7, 70, 700) can either be assisted by the force which can be accumulated in the preload means (10) of said reservoir, or can be carried out exclusively by means of the force which can be accumulated in the preload means (10) of said reservoir.

* * * * *